Figure 1:
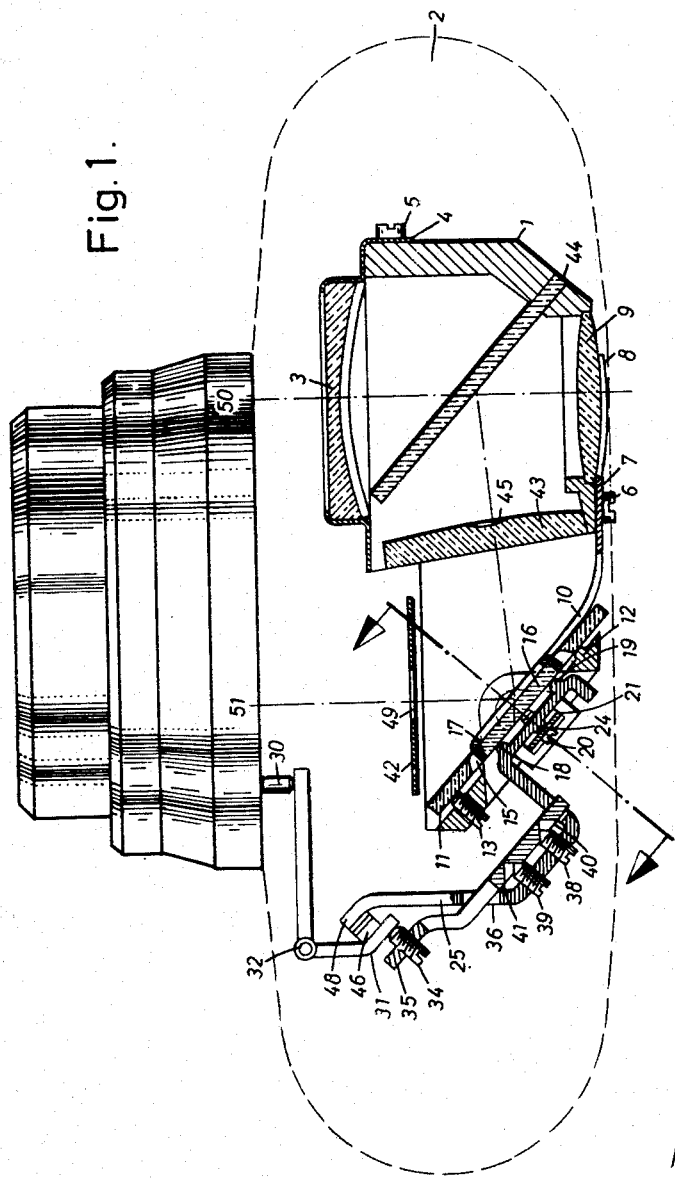

Sept. 29, 1964 K. H. LANGE 3,150,579
CAMERA BRIGHT-FRAME VIEWFINDER WITH COUPLED RANGEFINDER
Filed May 2, 1961 2 Sheets-Sheet 1

INVENTOR:
Karl Heinz Lange
By Maxwell E. Sparrow
Attorney

Sept. 29, 1964  K. H. LANGE  3,150,579
CAMERA BRIGHT-FRAME VIEWFINDER WITH COUPLED RANGEFINDER
Filed May 2, 1961  2 Sheets-Sheet 2

INVENTOR:

Karl Heinz Lange

By  Maxwell E. Sparrow

Attorney

United States Patent Office 3,150,579
Patented Sept. 29, 1964

3,150,579
CAMERA BRIGHT-FRAME VIEWFINDER WITH COUPLED RANGEFINDER
Karl Heinz Lange, Bunde-Ennigloh, Westphalia, Germany, assignor to Balda-Kamerawerk Rudolf Gruter, Kommanditgesellschaft, Westphalia, Germany, a company of Germany
Filed May 2, 1961, Ser. No. 107,142
Claims priority, application Germany May 5, 1960
8 Claims. (Cl. 95—44)

Photographic cameras, particularly miniature cameras, are today preferably constructed with a coupled rangefinder and with a bright frame which is reflected into the viewfinder to define the picture area.

At the same time, semi- or fully automatic exposure control is desirable as far as possible, this being achieved by automatic control of exposure time, lens aperture, or both. These devices generally require a considerable amount of space inside the camera. Since it is generally preferable to be able to observe the exposure controller or exposure meter through the viewfinder the meter mechanism must be disposed in the immediate vicinity of the rangefinder, i.e., generally inside the camera top. Since this space is very limited, however, it is desirable to reduce the amount of space required for the combined viewfinder.

Various ways have already been disclosed or proposed to this end.

In order to avoid an excessively long rangefinder base, it has been proposed that the bright-frame image and the range-finder base image should be guided via one and the same full mirror. Deflection of the rangefinder image is effected in manner known per se, by a pivoting lens or rotatable glass prisms in this case.

In a bright frame viewfinder with short-base coupled rangefinder in accordance with the present invention, the rangefinder image and the bright-frame image are reflected into the viewfinder by two separate mirrors, the reflection surfaces of which form substantially one plane, the mirror which reflects the rangefinder image being pivotal so as to permit displacement of the rangefinder image.

In such an arrangement, the mirror reflecting the bright-frame image is centrally formed with an aperture, preferably rectangular, the pivotal mirror being freely rotatable within this aperture in a suitable mount. This considerably reduces the overall length of the system in the direction of its longitudinal axis, since no space is required between the field lens and the bright-frame mirror to accommodate a pivotal lens and its mount.

The means for mounting and adjusting the pivotal mirror can in the present case be accommodated in what is in any case dead space behind the bright-frame mirror.

Figure 2:
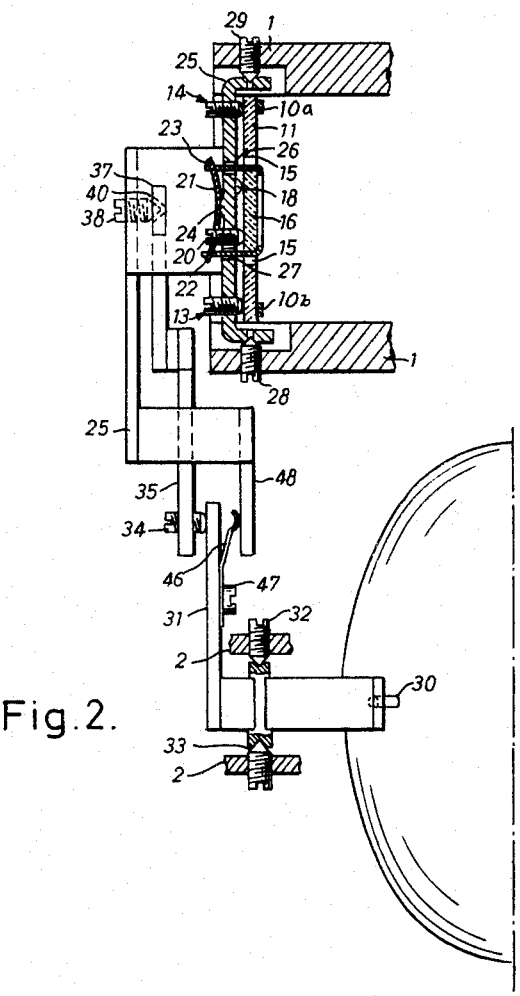

An embodiment of the invention is illustrated by way of example in the accompanying drawings, in which:

FIGURE 1 is a plan view of the partially sectioned combined viewfinder showing the arrangement of the transmission system and the camera body; and FIGURE 2 is a section on the line A—B of FIGURE 1.

In the embodiment shown in the drawings, a rangefinder housing 1 is rigidly secured to the camera body 2. A viewfinder lens 3 is fastened on the housing 1 in a viewfinder lens mount 4 by means of screws 5. An H-shaped leaf spring 7 is also fastened on the housing 1, by means of two screws 6, and secures an eyepiece lens 9 by one forked end 8. By its other forked end 10, and two prongs 10a and 10b, the spring 7 presses a bright-frame mirror 11 against a three-point support formed by a cam 12 and two adjusting screws 13 and 14. The bright-frame mirror 11 has a rectangular aperture 15 through which a pivoting mirror 16 projects. The latter, by means of a pivoting mirror mount 17, is held by a leaf spring 21 against a three-point support formed by two cams 18, 19 and an adjusting screw 20. The leaf spring 21 projects through two slots 22 and 23 in the pivoting mirror mount 17 and is supported on a cam 24. The cams 18, 19 and 24 are disposed on a mirror carrier 25, which by means of two apertures 26 and 27 fixes the pivoting mirror holder 17 in a certain position.

The mirror carrier 25 is mounted to be easily rotatable and play-free in the housing 1 by means of bearing screws 28 and 29, on an axis that is preferably, as shown, situated in the centre of the reflection surface of the pivoting mirror 16.

The adjustment originating from the lens focussing system (not shown) through the pin 30 is transmitted by a two-armed lever 31 which is mounted in the camera body 2, for example, by means of bearing screws 32 and 33. The focussing movement is communicated to a compensating slide 35 by an ∞-adjusting screw 34. The compensating slide 35 is fitted through the slots 36 and 37 of the mirror carrier 25 and is secured by means of two pointed screws 38 and 39. Since the two pointed screws 38 and 39 project into two conical recesses 40 and 41 the distance between which is greater than that between the two adjusting screws 38 and 39 themselves by an amount corresponding substantially to half the adjusting screw diameter, it is possible for the compensating slide 35 to be screwed into a different lateral position by screwing one adjusting screw in and the other out. In consequence the point of contact between the ∞-adjusting screw 34 and the lever 31 varies.

This arrangement enables any differences in the lever system transmission ratio due to production tolerances to be compensated. A spring 46 is also fastened on the lever 31 by a screw 47. The spring acts on an arm 48 of the mirror carrier 25 and thus brings the ∞-adjusting screw against the lever 31.

The image of a bright-frame mask 42 is transmitted to the photographer's eye through the bright-frame mirror 11 and a compensating lens 43, a transparent mirror 44 and an eyepiece lens 9. In the region 45 thereof where the rangefinder image rays pass through it, the compensating lens 43 has the same optical properties as the viewfinder lens 3. The bright-frame mask 42 also has an aperture 49 to limit the rangefinder field, and this has a very advantageous effect when the bright-frame mask 42 is moved to compensate for viewfinder parallax.

The mode of adjustment of the arrangement described is as follows: The viewfinder image and the rangefinder image are first brought into one plane by rotation of the adjusting screw 20 with consequent pivoting of the mirror 16. The ∞-adjusting screw 34 is then turned so that in the ∞-position of the lens the axes 50 and 51 of the viewfinder and rangefinder, respectively, are exactly parallel and the viewfinder and rangefinder images coincide. If the lens is now focussed to, say, 1 metre and if the rangefinder and viewfinder images do not coincide for an object at this distance, the transmission ratio can be appropriately corrected by appropriate displacement of the point of the contact between the ∞-adjusting screw 34 and the lever 31 by means of the adjusting screws 38 and 39. It will then generally be necessary to carry out a new ∞-matching by means of the screw 34.

By means of the mirror 11, the image of the bright-frame mask 42 is also reflected via the mirror 44 into the viewfinder. If, as a result of production tolerances, the two mirrors 11, 44 are not exactly parallel or if the bright-frame mask 42 is not in the correct position to give an image having its centre coincident with the viewfinder axis 50, it is possible to shift the image of the bright-frame mask 42 to the correct point by means of the adjusting screws 13 and 14, since the two prongs 6a and 6b of the spring 7 cause the mirror 11 to follow the movements of the adjusting screws 13 and 14 exactly.

The present invention thus provides a short-base bright-frame viewfinder with coupled rangefinder with the optimum utilisation of space that may be constructed and adjusted without production difficulties.

I claim:

1. In a camera, the combination of a two-axis bright-frame viewfinder with a coupled rangefinder, said viewfinder having a viewfinder field, comprising: a bright-frame mask having an aperture, a first mirror having an aperture, said first mirror reflecting an image of said mask into said viewfinder field, and a second mirror pivotally mounted within said aperture of said first mirror substantially coplanar therewith, said second mirror rocking about an axis parallel to said first mirror, responding to camera-focussing adjustment, said second mirror adapted to reflected a rangefinder image received through the said aperture of said bright-frame mask into said viewfinder field.

2. In a camera, the combination according to claim 1 including transmission means coupling said second mirror to camera focussing mechanism and comprising a lever of adjustable length for varying the degree of rocking of the second mirror in response to a predetermined adjustment of the focussing mechanism.

3. The apparatus of claim 2, said lever comprising a mirror carrier arm and a compensating slide movable longitudinally of such arm, a pair of longitudinally spaced-apart pointed screws in said arm engaging differently spaced-apart conical recesses in said slide for effecting longitudinal adjustment of the slide in response to differential adjustment of said screws.

4. In a camera, the combination according to claim 3, and said compensating slide having an infinite-adjusting screw engaging the camera focussing means.

5. In a camera, the combination according to claim 4, and having a spring supported by said rocking mirror mounting, said spring securing the engagement of said infinite-adjusting screw.

6. In a camera, the combination according to claim 1 including a rocking mounting for said second mirror, a mirror carrier and spring means securing said mounting to said carrier, a pair of laterally spaced-apart support projections and a vertically offset adjusting screw on said carrier engaging the back side of said second mirror providing a three-point support against the thrust of said spring means, the adjustment of said adjusting screw rocking the second mirror about a horizontal axis defined by said support projection for adjusting the vertical position of the reflected rangefinder image.

7. In a camera, the combination according to claim 1, and comprising an H-shaped leaf spring holding the lens of said viewfinder with one end and said first mirror with the other end.

8. In a camera, the combination according to claim 1, and comprising means arranging the rocking axis of said second mirror in the mirror plane of said first mirror.

References Cited in the file of this patent
UNITED STATES PATENTS

| | | |
|---|---|---|
| 2,273,355 | Hineline | Feb. 17, 1942 |
| 2,302,584 | Steiner | Nov. 17, 1942 |
| 2,983,208 | Sapp | May 9, 1961 |